(12) United States Patent
Rishel et al.

(10) Patent No.: US 8,849,749 B2
(45) Date of Patent: Sep. 30, 2014

(54) LOAD BALANCING IN PARALLEL DATABASE SYSTEMS USING MULTI-REORDERING

(75) Inventors: William S. Rishel, Sunnyvale, CA (US); Ryder B. Rishel, Mountain View, CA (US); Derek A. Taylor, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 98 days.

(21) Appl. No.: 12/860,782

(22) Filed: Aug. 20, 2010

(65) Prior Publication Data

US 2011/0282832 A1 Nov. 17, 2011

Related U.S. Application Data

(60) Provisional application No. 61/334,693, filed on May 14, 2010.

(51) Int. Cl.
*G06F 17/30* (2006.01)
*G06F 9/50* (2006.01)

(52) U.S. Cl.
CPC ........ *G06F 9/5083* (2013.01); *G06F 17/30283* (2013.01); *G06F 17/30445* (2013.01)
USPC ....................................................... 707/609

(58) Field of Classification Search
None
See application file for complete search history.

(56) References Cited

U.S. PATENT DOCUMENTS

| 5,970,495 | A | * | 10/1999 | Baru et al. ............................ 1/1 |
| 7,657,581 | B2 | * | 2/2010 | Orenstein et al. ............. 707/661 |
| 2006/0111110 | A1 | * | 5/2006 | Schwarz et al. ............... 455/439 |
| 2006/0241968 | A1 | * | 10/2006 | Hollebeek .......................... 705/2 |
| 2007/0271570 | A1 | * | 11/2007 | Brown et al. .................. 718/105 |
| 2011/0246434 | A1 | * | 10/2011 | Cheenath et al. ............. 707/703 |

OTHER PUBLICATIONS

Ganesan et al., Online Balancing of Range-Partitioned Data With Application to Peer-to-Peer Systems, Proceedings of the 30th VLDB Conference, Toronto, Canada, 2004.
Scheurmann et al., "Data Partitioning and Load Balancing in Parallel Disk System", dated 1998, vol. 7, No. 1, 19 pages.
Vingralek et al., "SNOWBALL: Scalable Storage on Networks of Workstations with Balanced Load", vol. 6, No. 2, dated 1998, 39 pages.
Rao K. et al., "Load Balancing in Structured P2P Systems", International Workshop on Peer-to-Peer Systems, dated 2003.

* cited by examiner

*Primary Examiner* — Bai D. Vu
(74) *Attorney, Agent, or Firm* — Hickman Palermo Truong Becker Bingham Wong LLP

(57) ABSTRACT

Load balancing in a parallel database system is performed using multi-reordering, in which a sequence of multiple processors (two, three, or more) that have small average load (for example, the smallest of any such sequence) is selected to participate in load balancing. In the case of three adjacent low-load processors, the load of all three is evenly distributed over two of them, and the remaining processor becomes a free processor. The free processor is moved adjacent to a high-load processor, the load of which is then shared with the free processor. Data is moved in a "transaction" so that the view of data is always consistent. The database continues to service requests from a former location while data undergoes a transfer.

33 Claims, 6 Drawing Sheets

GBG Operations
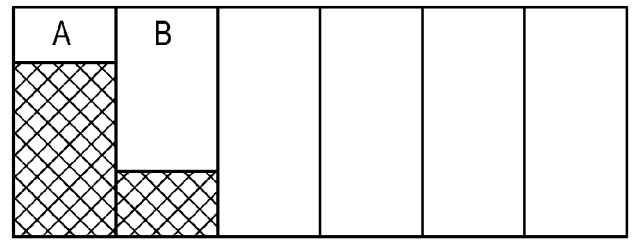
FIG. 3A
NbrAdjust involving partitions A and B
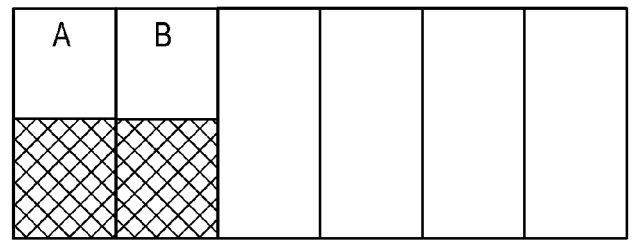
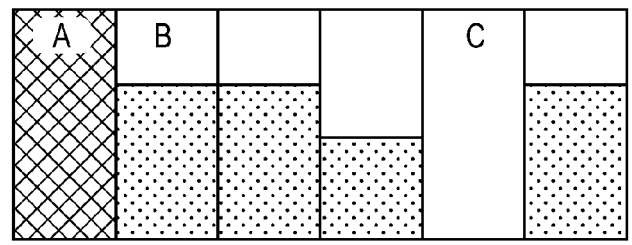
FIG. 3B
Recorder involving partitions A and C
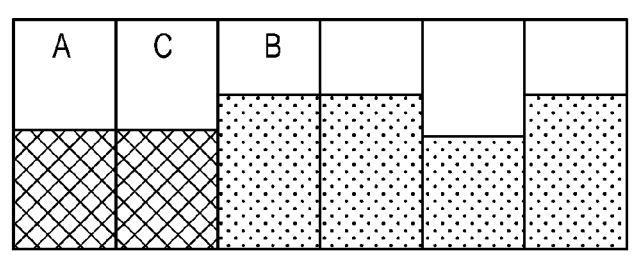

Multi-Recorder Operation as Sequential Steps*

LOAD BALANCING IN PARALLEL DATABASE SYSTEMS USING MULTI-REORDERING

RELATED APPLICATIONS

This application claims the benefit of U.S. Application No. 61/334,693 entitled "Data Skew Management in DataScaler," filed May 14, 2010, incorporated herein by reference.

BACKGROUND

The present invention relates to load balancing in parallel database systems.

Parallel database systems are known. Referring to FIG. 1, a block diagram is shown of a portion of an exemplary database system 100. The database system 100 shown is a parallel database system having multiple database nodes 101a-101n coupled to a communication medium 103 such as a bus, backplane, network segment, etc.

A database node 101n is illustrated in further detail. A database processor 111n is coupled via a bus 112n to an optional database co-processor 113n. Both the database processor 111n and the optional database co-processor 113n are coupled to memory 115n via buses 117n, 119n, and may be coupled to the same memory or to different memories. This parallel database configuration is merely exemplary of various configurations may be used to implement a database node of a parallel database system.

Parallel database systems allow for parallelization. FIG. 2 shows parallelization using traditional (explicit) shards, as is known in the art. With traditional shards, the database data and the associated management data (including indexes, strings, transaction state and schema catalog) are distributed across some number of address spaces (20), shown as in FIG. 2 as k address spaces. Within each address space is a subset of the database data (shown as data 0 through data k−1), as well as the associated indexes, strings, transaction states and schema catalog (22). Such parallelization may significantly improve search time.

In a parallel database system such as those of FIG. 1 and FIG. 2, data partitioning is often employed wherein tuples are partitioned according to a key value with different nodes being assigned tuples having key values within different assigned ranges or assigning tuples to nodes based on a hash of their key values. When the database is deployed using data partitioning, the number of tuples stored will ideally be balanced between the database nodes. In the course of database operation, the number of tuples stored may become unbalanced between database nodes. Such imbalance is referred to as data skew.

In parallel database systems data skew and execution skew are two well known obstacles to optimal performance of parallel database operations. Data skew occurs when tuples are unevenly distributed across the nodes of a database which can cause aggregate queries to perform only as good as the highest loaded node. Execution skew occurs when a query operation is imbalanced as it selects tuples from the nodes of a database. The present application addresses the problem of minimizing data skew on a parallel system where tuples are partitioned across the nodes according to a range partition scheme. The approach described herein is a system for monitoring and rebalancing data across the nodes so as to achieve an even distribution.

The context of the load balancing model described herein will be assumed to apply to shared-nothing parallel database architectures that partition data across nodes according to a range partitioning scheme. The goal of a load balancing architecture is to evenly distribute data across all the nodes of a database so that aggregate queries are executed with low response times. While the present application describes an approach for eliminating data skew, one could apply the same techniques to minimize execution skew.

PRIOR ART REFERENCES

1. P. Ganesan, M. Bawa, and H. Garcia-Molina, Online Balancing of Range-Partitioned Data with Applications to Peer-to-Peer Systems, Proceedings of International Conference on Very Large Data Bases (VLDB), pages 444-455, August 2004.
2. R. Vingralek, Y. Breitbart and G. Weikum, SNOWBALL: Scalable Storage on Networks of Workstations with Balanced Load, Distributed and Parallel Databases vol 6, no 2, 1998, pp. 117-156.
3. A. Rao, K. Lakshminarayanan, S. Surana, R. Karp and I. Stoica, Load Balancing in Structured P2P Systems, International Workshop on Peer-to-Peer Systems, 2003.
4. P. Scheuermann, G. Weikum and P. Zabback, Data Partitioning and Load Balancing in Parallel Disk Systems, VLDB Journal vol 7, no 1, 1998, pp. 48-66.

The foregoing references are believed to be illustrative of the state of the art. Various load balancing procedures have been proposed to counter data skew. Many approaches are targeted towards peer-to-peer systems which make use of distributed hash tables (DHT) to address data [3], employ the use of file striping to dynamically balance data across disks in a shared-disk database [4], and take steps to minimize data migration thrashing [2].

The load balancing approaches of greatest interest for purposes of the present description are those which make use of range partitioning in a shared-nothing parallel database. The load balancing approach described by Ganesan, et al [1], is referred to herein as the GBG procedure.

The GBG procedure relies on two principal operations to perform load balancing, a nbrAdjust operation and a reorder operation. In the nbrAdjust operation, illustrated in FIG. 3A, tuples are moved from a heavily-loaded node to a logically adjacent more lightly-loaded node. Adjacency means that the data partitions or record ranges assigned to the nodes are adjacent. In the reorder operation, illustrated in FIG. 3B, a lightly-loaded node is emptied by transferring its tuples to a selected adjacent node, and the resulting empty node is logically moved so as to be adjacent to a more heavily-loaded node. The load of the heavily loaded node is then split with its new empty neighbor node. In brief, a node is "freed up" by transferring its node load to its logically adjacent neighbors (within the partition scheme) and then reassigning the "free" node to be logically adjacent to the heavily loaded node so the load can be redistributed between the overloaded node and the freed node.

The GBG Procedure is performed in conjunction with tuple inserts and tuple deletes. When a node's load increases beyond a threshold it attempts to perform a nbrAdjust operation with a lightly-loaded neighbor. If both neighbors have high load, it attempts a global reorder operation with the globally least-loaded node. If neither nbrAdjust nor reorder can be performed successfully, then the system load is considered to be balanced. In the case of deletions, when a node's load drops below a threshold, it attempts to perform nbrAdjust to relieve a neighbor. If its neighbors do not require relief, then it attempts to perform global reorder to relieve the highest-loaded node in the system.

Despite the contributions of the GBG Procedure more advantageous methods of load balancing are desired. Limitations of the GBG Procedure include: (1) It uses the ratio of the highest load and the smallest load for a measure of data imbalance and its procedure seeks to minimize that ratio. However such a ratio is not a suitable imbalance measure. (2) The GBG procedure can lead to load balance thrashing, where a neighbor node receiving tuples due to rebalancing quickly passes a threshold and itself needs to be rebalanced again. (3) Balancing operations are tightly coupled with the database operations that trigger them. This means that balancing operations are not performed in parallel and therefore increase query response time.

SUMMARY

A load balancing procedure (hereafter called the Global Balance procedure) is described that overcomes disadvantages of the prior art in multiple respects. The overhead burden of load balancing operations is dramatically reduced while the balanced distribution states attained are markedly superior to those of the prior art approaches. In addition there is remarkable consistency in the degree of load distribution attained regardless of prior skew state. These and other important improvements in load balancing performed per the Global Balance procedure are described below. The goal of the Global Balance procedure is to enable the execution of global aggregate queries, which require access to data on all nodes, with low query response times.

DRAWING FIGURES

FIG. 3 including FIG. 3A and FIG. 3B is a diagram illustrating a known nbrAdjust operation and a known reorder operation.

FIG. 4 including FIG. 4A, FIG. 4B, FIG. 4C and FIG. 4D is a diagram illustrating a multi-reorder operation.

Figure 5:
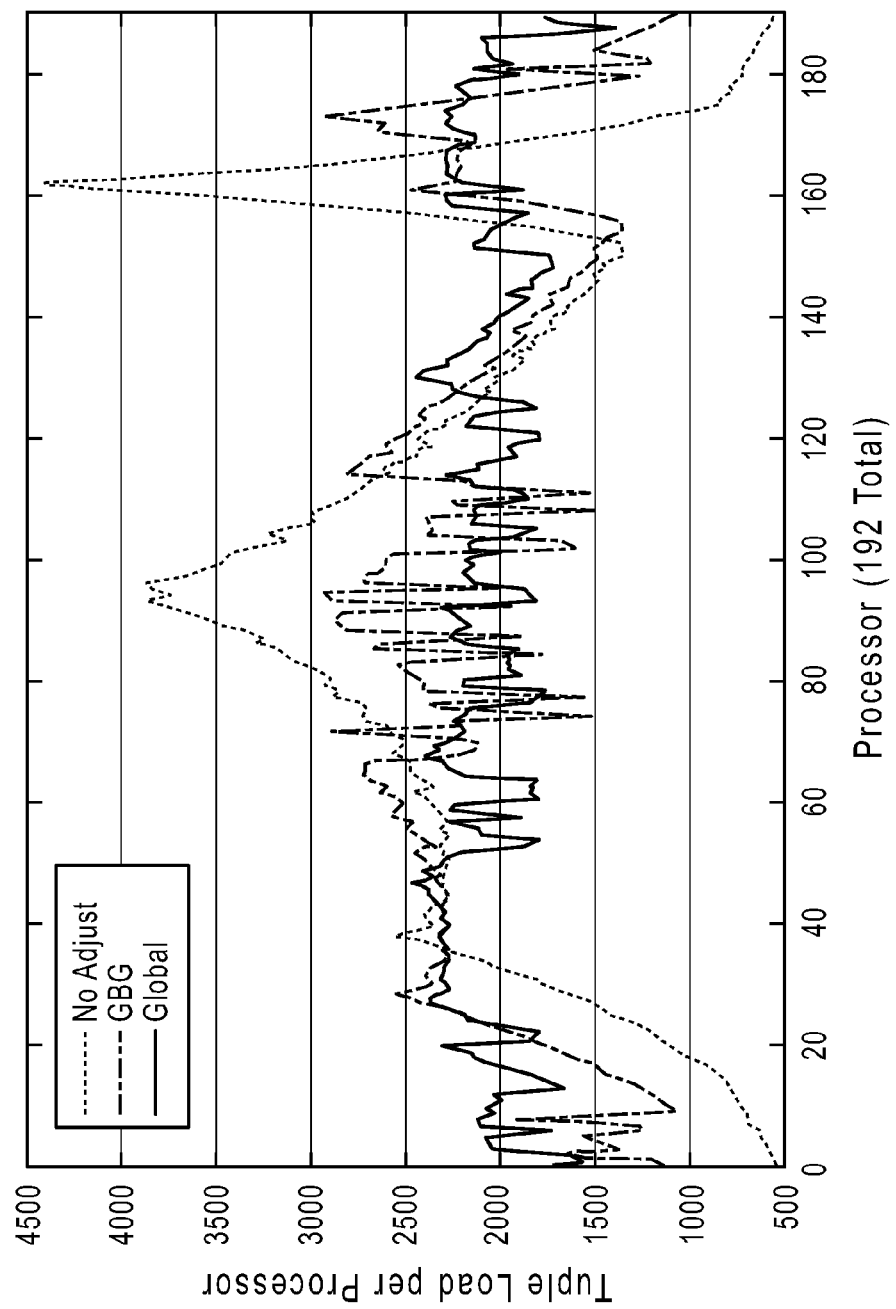

FIG. 5 is a diagram illustrating load balancing performance

Figure 6:
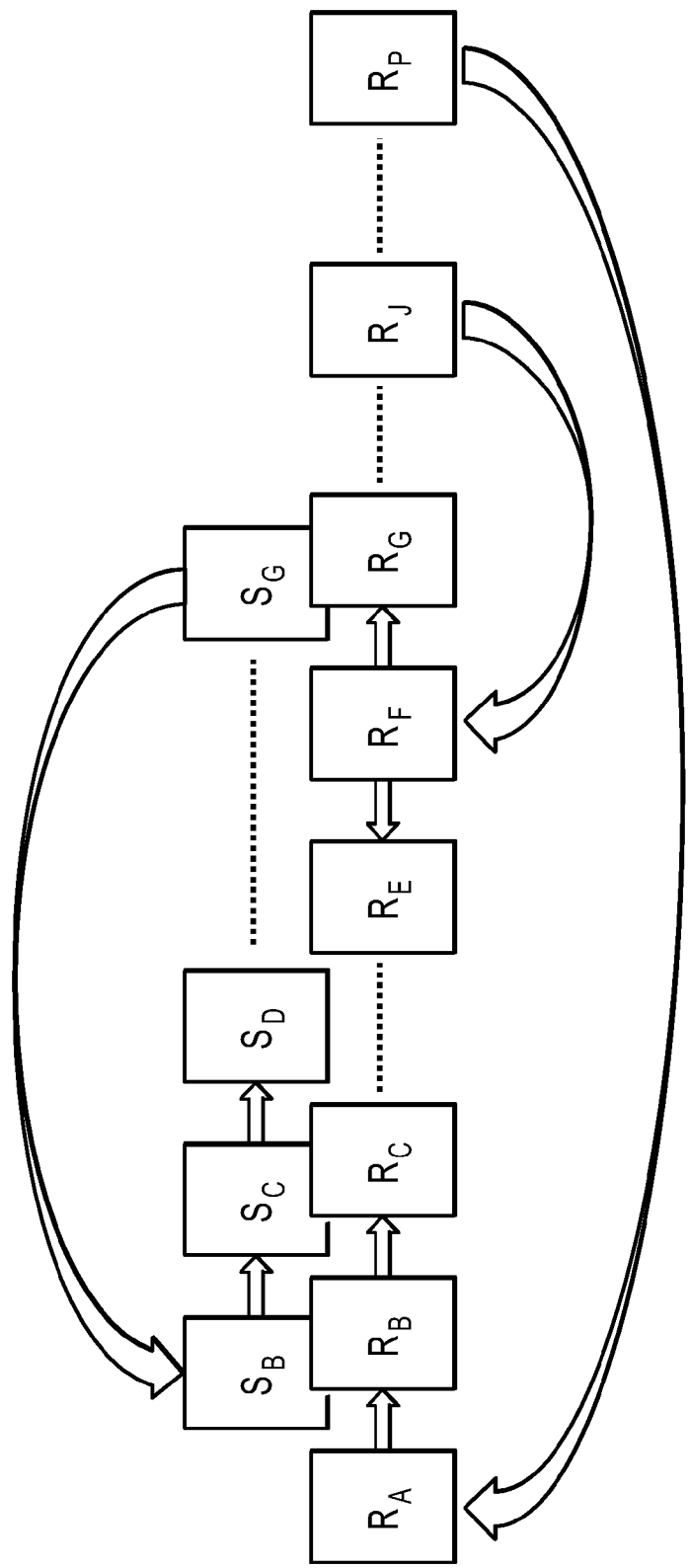

FIG. 6 is a diagram illustrating the concurrent nature of the Global Balance procedure.

DETAILED DESCRIPTION

In the following description, for purposes of explanation, specific nomenclature may be set forth to provide a thorough understanding of the various inventive concepts disclosed herein. However, it will be apparent to one skilled in the art that these specific details are not required in order to practice the various inventive concepts disclosed herein.

Some portions of the detailed descriptions that follow may be presented in terms of algorithms and symbolic representations of operations on data bits within a computer memory. These algorithmic descriptions and representations are the means used by those skilled in the data processing arts to most effectively convey the substance of their work to others skilled in the art. An procedure is here, and generally, conceived to be a self-consistent sequence of serial and parallel steps leading to a desired result. The steps are those requiring manipulations of physical quantities.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specifically constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories ("ROMs"), random access memories ("RAMs"), EPROMs, EEPROMs, magnetic or optical cards, or any type of media suitable for storing electronic instructions, and each coupled to a computer system bus.

The algorithms, processes, and methods presented herein are not inherently related or restricted to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

DEFINITIONS

As used herein, a "relation" is either a database table or index. A relation's tuples are either the rows from a table or the entries in an index.

A "partition node" is a node which is associated with a unique partition boundary for a given relation. As used herein, "node" refers to a partition node.

A "range partition scheme" is a method for distributing relation tuples across a set of partition nodes using a sortable attribute of a relation (the range attribute) to define partition boundaries within the range, one partition for each node. Tuples with a range attribute value that maps to the sub-range of a partition node are assigned to that node.

For a given relation and node, the "node load" is the number of tuples of the relation that are stored on the node.

The "node load threshold" is the minimum node load required before a node is considered for balancing.

For a relation R and the set P of nodes with a node load greater than the mean system load and where $\mu$ is the mean system load, $p_i$ is a node in set P, and load($p_i$) is the load of node $p_i$, then the "system skew" is given by:

$$\text{system skew} = \sqrt{\Sigma_{i=1}^{n}(\text{load}(p_i) - \mu)^2}$$

The resulting value for system skew is a measure of the degree to which the above-average loads collectively deviate from the mean system load.

In order to determine whether a given system skew is sufficiently high to trigger a load balance operation a "system skew threshold" is defined as a percentage of the maximum capacity of a node. For example, if the node's maximum capacity is 10 million tuples and the system skew threshold is 20% then the system skew must be greater than or equal to 2 million before a load balancing operation will be triggered.

A "load balance operation" alters defined partition boundaries and moves tuples between nodes according to the new boundaries with the effect of reducing the system skew for highly loaded nodes.

The "load balance overhead" is an estimate of the use of system resources, including CPU, memory, and network bandwidth that would be required to fulfill the load balance operation which would otherwise be used for normal database operations. The cost is determined by the number of tuples that must move to a free node.

Features of the Global Balance Procedure

The following are salient features of the Global Balance procedure as described herein:

Concurrent Operation

The Global Balance procedure is itself a parallel database operation. The movement of data makes use of normal database facilities and does not require that other operations are blocked while data is moved. A load balance operation is performed as a transaction and its effects are not visible to other concurrent transactions until all of its tuples have been moved, the partition boundaries have been updated, and the transaction has committed. Read requests for tuples that are being moved to a new location are serviced from existing versions residing at the old location. Write requests for tuples that are being moved either abort, wait, or are forwarded to the new location and are applied as part of the rebalance transaction. One way forwarding is accomplished is through the use of predicate locks. Once the partition boundaries have been updated all reads and writes for the moved tuples are directed at the new location.

Multiple Dimensions of Parallelism

The Global Balance procedure takes maximal advantage of multiple nodes through parallel operation. The degree of parallelism increases as the number of nodes in the system increases.

Balancing operations occur for each relation independently. Balance operations that occur on different relations do not conflict and can be executed in parallel. Multiple independent balance operations can occur on the same relation so long as no two balance operations have any node in common Data movement within a single balance operation occurs across all affected nodes in parallel. These various dimensions of parallelism may be observed with reference to FIG. 6. FIG. 6 illustrates two relations, R and S, distributed across various nodes of a database system. The relation S is distributed across nodes that include nodes B, C, D, and G as well as other nodes not shown. A portion of the relation S stored on node B is designated as $S_B$. Portions of the relation S stored on other nodes are designated in like fashion. The relation R is distributed across nodes that include nodes A, B, C, E, F, G, J, and P as well as other nodes not shown. A portion of the relation R stored on node A is designated as $R_A$. Portions of the relation R stored on other nodes are designated in like fashion. In the example shown, nodes B, C and G store portions of both relation S and relation R.

At an instant of time illustrated in FIG. 6, three rebalancing operations are in progress. A first rebalancing operation involves shifting load between $S_B$, $S_C$ and $S_D$ to allow a portion of $S_G$ to be offloaded to $S_B$. A second rebalancing operation involves shifting load between $R_A$, $R_B$ and $R_C$ to allow a portion of $R_P$ to be offloaded to $R_A$. A third rebalancing operation involves shifting load between $R_E$, $R_F$ and $R_G$ to allow a portion of $R_J$ to be offloaded to $R_F$. The second and third rebalance operations are concurrent on relation R. Concurrent operations on the same relation are supported so long as the participating nodes for each operation are mutually exclusive. The rebalance operation on relation S does not interfere with the concurrent rebalance operations for relation R on common nodes B, C and G.

During the rebalancing operations, database clients (not shown) may make database requests (e.g., insert, add, delete requests) without those requests being blocked (request and rebalancing concurrency). This concurrency may be achieved as previously described. That is, a load balance operation is performed as a transaction and its effects are not visible to other concurrent transactions until all of its tuples have been moved, the partition boundaries have been updated, and the transaction has committed. Read requests for tuples that are being moved to a new location are serviced from existing versions residing at the old location. Write requests for tuples that are being moved are forwarded to the new location and are applied as part of the rebalance transaction. One way forwarding may be accomplished is through the use of predicate locks. Once the partition boundaries have been updated all reads and writes for the moved tuples are directed at the new location.

Use of Idle Cycles

Data partitioning inherently means that there will always be some imbalance in data distribution across nodes. Hence there will always be some set of nodes which complete earlier than other nodes during a parallel query because they have fewer tuples to process. A significant advantage to the Global Balance procedure is that it utilizes the cycles made available by the early completion of a parallel query.

System Skew

The key factor affecting performance of queries in a parallel database is the node with the largest workload. Just as a chain is only as strong as its weakest link, a parallel query execution is only as fast as its slowest node. Therefore the factor to be minimized is the size of the largest load. Since: a) the largest load is what determines performance, and b) theoretical optimal performance is approached as the largest load approaches the mean load. The system skew measure (defined in the Definitions section) assesses the collective deviation from the system load mean of all the loads that are greater than the system load mean. The system skew measure is what the Global Balance procedure uses to assess the degree of system load imbalance.

Multiple Neighbor Redistribution

A key balancing method is to find a node with a low load, move its data to a neighbor, and then split the load of the overly loaded node with the now "free" node. The term "free" here means that since the node has unloaded all of its tuples to a neighbor, it is no longer logically tied to its former adjacent neighbors and so can be made a logically adjacent neighbor of the highly loaded node.

A multi-reorder operation, illustrated in FIG. 4, refers to a method that finds, instead of a single node with a low load, a sequence of multiple adjacent nodes that have a small average load of any such sequence. Depending on the combined load of the nodes in the sequence, it may be possible to move the combined load of the sequence onto a subset of the nodes in the sequence with an average load of the nodes in the smaller sequence low enough to free up the remaining nodes for use in offloading high loads elsewhere.

For example, in the case of three adjacent low-load nodes with the smallest average load, the load of all three might be redistributed over two of them, the remaining node becoming a free node, or if the combined load of the three nodes is small enough the load of all three could be moved to just one of them, thus freeing up two nodes.

Figure 1:
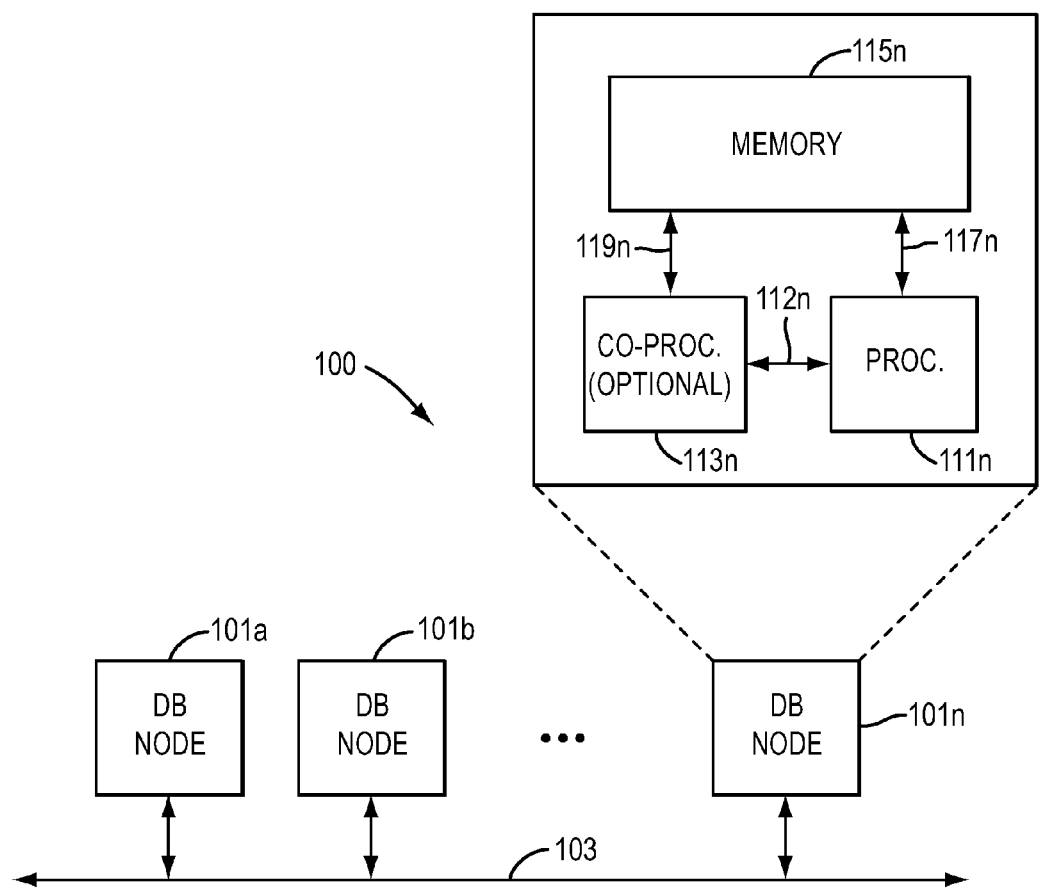
FIG. 1 is a diagram of a portion of a parallel database system
Figure 2:
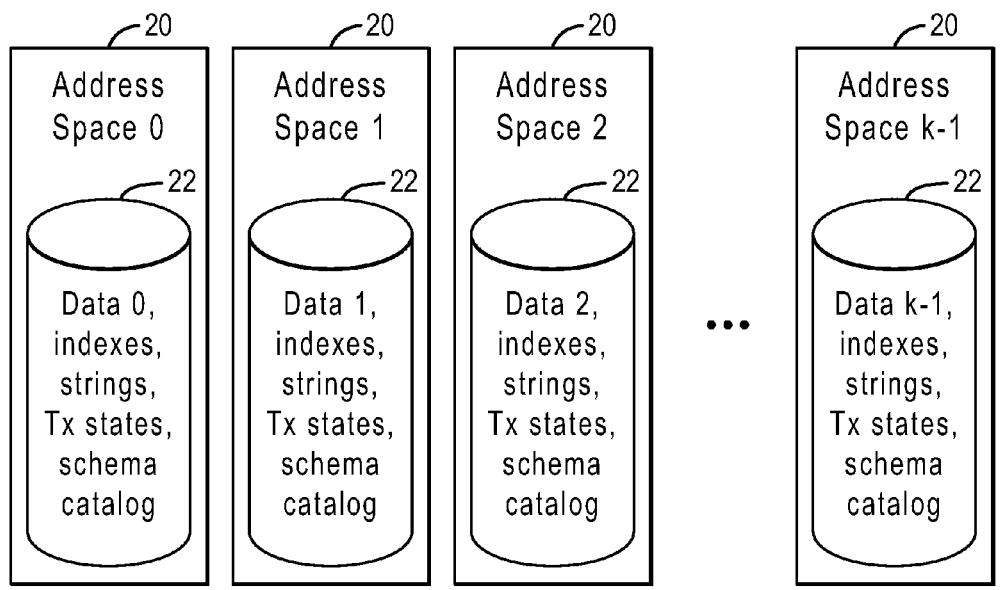
FIG. 2 is another diagram of a portion of a parallel database system.
Figure 4A:
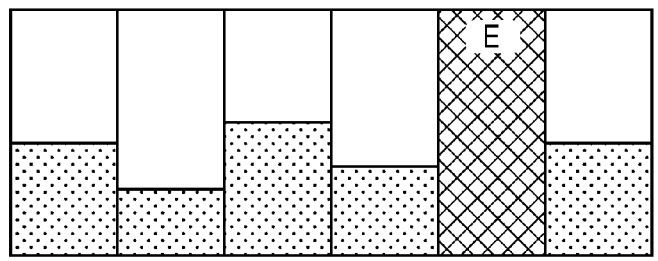
Figure 4B:
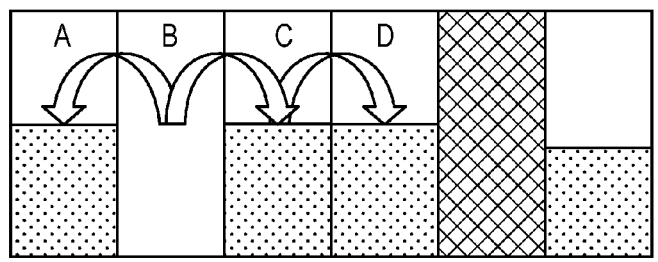
Figure 4C:
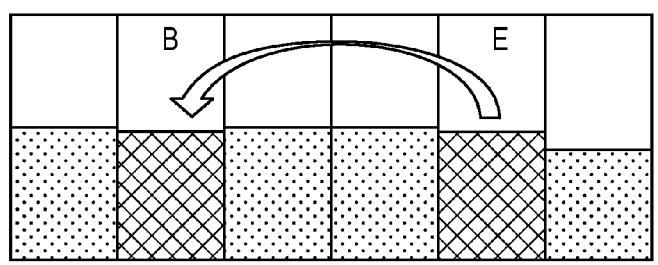
Figure 4D:
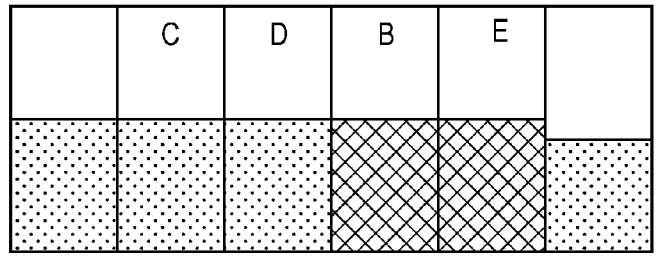

In FIG. 4A, partition E fills past the threshold and triggers a rebalance procedure. The succeeding steps of FIGS. 4B-4D then occur in parallel. In FIG. 4B, partitions A, B, C and D are redistributed to leave B empty. In FIG. 4C, half of the data from partition E is moved to B. In FIG. 4D, partitions B, C and D are reassigned to match new partition boundaries.

Overhead-Benefit Analysis of Candidate Operations

When load balancing is to be performed on a given node, a set of candidate balance operations is identified, and for each candidate a projection of the resultant system skew (see Definitions section) should the candidate operation be performed is calculated. A load balance overhead (see Definitions section) is also calculated for each candidate. Based on the projected change in the load balance measure (benefit) and the overhead in moving tuples to realize that state, the net benefit for each of the projected operations is calculated, which are then compared and the most favorable selected for execution.

Description of the Procedure

1. Each node has access to partition statistics which include an estimate of the number of tuples stored on each node for every relation in the database. Based on this information the system skew is calculated. If the calculated system skew is less than or equal to the system skew threshold, then no load balancing need be performed and the task ends, else continue to the next step. The algorithm does not depend on the partition statistics being exactly correct, as an approximate estimate is adequate. The algorithm does assume that the partition statistics as seen by each individual node is eventually consistent.
2. At this step it is assumed that the system skew exceeds the system skew threshold and a determination needs to be made whether the node on which the task is running needs to be load balanced. If the load of the node is greater than the load of all other nodes, based on the partition statistics, then the node needs to be load balanced, else the task ends.
3. A calculation is made to determine how many free nodes will be needed to accommodate the tuples from this loaded node: (load−mean load)÷mean load) rounded up=free nodes needed. It is important to distribute the loaded node's tuples to an appropriate number of free nodes to avoid load balance thrashing.
4. Using the partition statistics, a search is made for sequences of adjacent nodes with sufficiently low average load that if the combined load were redistributed over a subset of the nodes in the sequence, then the average load for the new (smaller) sequence would still be below the average load of the system, and at the same time yielding the largest number of free nodes possible from the sequence. If the number of free nodes yielded is the same as the number required in step 3 above then the sequence of adjacent nodes becomes a candidate sequence. It is desirable to take the largest number of free nodes while still leaving an average load for the new sub-sequence that is less than the mean system load, as otherwise load balance thrashing may occur. Hence it is recommended to match the free nodes yielded from the sequence with the number of free nodes required to load balance the node on which the task is running. There are many methods to determine a candidate subset. For example, a linear search for the least loaded candidate sequence.
5. Once a set of candidate sequences is identified, calculate each system skew that would result from balancing using each sequence. Each computed system skew result is the projected benefit of performing the load balancing operation with that candidate sequence.
6. The load balance overhead for each candidate sequence is computed. The candidate with the lowest ratio of overhead to benefit is selected. In following steps the nodes in the selected sequence are referred to as the "target nodes".
7. The task starts a transaction.
8. The task sends a network request to the target nodes to lock them from any other concurrent balance operations. If all targets cannot be locked, a different candidate sequence is selected (steps 4-6 above) from the candidate set which do not include the targets that failed to lock and tries again. If no targets can be successfully locked, then the task aborts the current transaction and unlocks any locked nodes. The recurring task will execute later and try again.
9. If the task successfully locks the target nodes, the task sends to the target nodes the new partition boundaries. The new partition boundaries will take effect after the move operation is complete and the transaction commits. The new partition boundaries communicate what actions to take in order to complete the balance operation. Once the new boundaries have been communicated, all nodes concurrently move their tuples to satisfy the new boundaries.
10. The task communicates the new partition boundaries to all other nodes.
11. The task commits the transaction (which action also unlocks the target node locks from step 8).

Benefits of the Global Balance Procedure

In examining the benefits of the Global Balance procedure, the GBG methodology, believed to be representative of the prior art, will be used as basis for comparison.

Since it is the node with the largest load that in many respects serves as the "least common denominator" in gating performance of the system it is natural to use the ratio of the largest load to the mean system load to characterize the benefit yielded by a particular load balance procedure. In what follows the ratio of largest load to mean system load will be referred to as the load balance ratio attained by the algorithm. A perfectly balanced system would yield a load balance ratio of 1.

Simulation Results

Simulations were run comparing performance of the GBG procedure and the Global Balance procedure. The data from Table 1 represents the comparative load balancing results of the two procedures. The number of nodes used for these simulations was 192.

TABLE 1

| Procedure | GBG | Global | GBG | Global | GBG | Global |
|---|---|---|---|---|---|---|
| Total Inserts | 50,000 | 50,000 | 100,000 | 100,000 | 150,000 | 150,000 |
| Largest Load (tuples) | 1,885 | 1,090 | 2,102 | 1,453 | 2,222 | 1,812 |
| Mean Load (tuples) | 781 | 781 | 1,042 | 1,042 | 1,302 | 1,302 |
| Ratio Largest/Avg | 2.41 | 1.40 | 2.02 | 1.39 | 1.71 | 1.39 |

Consistent Performance

The load balance ratios delivered by the Global Balance procedure are very consistent, while there is considerable variance in the load balance ratios from the GBG procedure (the ratios for the baseline GBG procedure range from 1.71 to 2.41 while for the Global Balance procedure the range is from 1.39 to 1.40). This relative stability of the Global Balance procedure suggests a greater reliability and predictability, which is very important in building a commercial system where the goal is optimal performance with minimal risk. When predicting available storage capacity, minimizing risk means using the largest load balance ratio that might potentially occur. Not only is the largest ratio for the Global Balance procedure (1.40) much lower than that for the GBG procedure (2.41) but the stability of the Global Balance procedure's ratios overall suggests a greater confidence in the reliability of assuming 1.40 as a maximum load balance ratio after completing the Global Balance procedure.

Query Performance

The performance of the system, when measured by query response time, is proportional to the largest node load. The worst-case relative performance of the Global Balance procedure versus the GBG procedure is the ratio of the highest load balance ratios obtained for the two algorithms, or 1.0−(1.40÷2.41)=0.42. That is, in the worst-case when using the Global Balance procedure to balance a system one can expect to reduce query response time up to 42% as compared to a system using the GBG procedure.

However, in the case of calculating response time it can be argued as more reasonable to use the expected average load balance ratio of the algorithm rather than the worst-case load balance ratio. Such an expected average is a difficult number to arrive at, but a rough estimate based on averaging the values in the data given above would be 1.94 for the GBG procedure, and 1.38 for the Global Balance procedure. Based on these ratios a system using the Global Balance procedure can be expected to reduce query response time up to 29% as compared to a system using the GBG procedure.

FIG. 5 shows a comparison between the node loads as balanced by the GBG procedure and the Global Balance procedure after inserting 300,000 tuples over 192 nodes. Notice how the graph for the GBG procedure retains much of the skew pattern of the unadjusted data, while the graph for the Global Balance procedure does not. Also note how the Global Balance procedure has moved data away from the high activity areas in the center of the graph. This is because Global Balance does not rely heavily on redistributing tuples to nodes that are already neighbors in the range, in contrast to the GBG procedure which seeks first to move tuples from over-loaded nodes to existing neighbor nodes. Since data skew can be caused by inserts to "hot spots" in the range of the partition, neighbors of highly loaded nodes are likely to become highly loaded themselves thus requiring the same tuples to be moved again, a form of load balance thrashing.

Available Data Capacity

In a partitioned database system, the available data capacity is limited to the available capacity of the most loaded node. Hence the data capacity of the system that can be reliably predicted is the available capacity of the most loaded node times the total number of nodes. If the system were optimally balanced the highest load would equal the mean load and the wasted capacity would be zero. Any difference, then, between the mean load and the largest load corresponds to wasted capacity, hence the "wasted capacity" is given by the formula:

(largest load−mean load)×number of nodes=wasted capacity

This means that load imbalance results not only in reduced performance but also reduced available capacity. Referring to the simulation results Table 2 the projected wasted capacity for each of GBG and Global Balance procedures is shown for 192 nodes:

TABLE 2

| Procedure | GBG | Global | GBG | Global | GBG | Global |
|---|---|---|---|---|---|---|
| Largest Load (tuples) | 1,885 | 1,090 | 2,102 | 1,453 | 2,222 | 1,812 |
| Mean Load (tuples) | 781 | 781 | 1,042 | 1,042 | 1,302 | 1,302 |
| Wasted Capacity (tuples) | 211,968 | 59,328 | 203,520 | 78,912 | 176,640 | 97,920 |
| Wasted Capacity Ratio relative to Global Balance procedure | 3.6 | 1.0 | 2.6 | 1.0 | 1.8 | 1.0 |

As shown in the table, the GBG procedure incurs wasted capacities ranging from 1.8 to 3.6 times that of the Global Balance procedure. Wasted capacity is never desired, particularly for an in-memory database system where memory is much more expensive than disk.

Minimal Load Balance Thrashing

Load balance thrashing occurs when balance operations move the same tuples repeatedly in a short period of time, causing unwanted communications costs. The discussion under the Consistent Performance section above refers to this issue in terms of tuples getting moved and then immediately moved again if initially moved to a nearby location. As indicated in that section the Global Balance procedure redistributes loads so as to avoid that particular kind of thrashing.

Another kind of thrashing that can occur is if a sequence of adjacent nodes from which a free node is extracted results in a new sub-sequence with an average load low enough that an additional free node could still be extracted from the sequence and still have a remaining sub-sequence with an average load below the system load mean. This means that the nodes in the new sub-sequence will need to have their tuples move again to retrieve the additional free node. This form of thrashing can be avoided if compression of a sequence of adjacent nodes to extract free nodes is only performed as an extraction of all possible free nodes such that the average load of the new sub-sequence is below the system load mean. As indicted in the Description of the Procedure section above, this is the approach employed by the Global Balance procedure and is another reason why Global Balance effectively minimizes load balance thrashing.

Particular embodiments of the present disclosure can take the form of an entirely hardware embodiment, an entirely software embodiment or an embodiment containing both hardware and software elements. In a particular embodiment, the disclosed methods are implemented in software that is embedded in a processor readable medium and executed by a processor, which includes but is not limited to firmware, resident software, microcode, etc.

Further, embodiments of the present disclosure can take the form of a computer program product accessible from a computer-usable or computer-readable medium providing program code for use by or in connection with a computer or any instruction execution system. For the purposes of this description, a computer-usable or computer-readable medium can be any apparatus that can tangibly embody a computer program and that can contain, store, communicate, propagate, or transport the program for use by or in connection with the instruction execution system, apparatus, or device.

In various embodiments, the medium can include an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers.

Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

From the foregoing description, it will be understood that the load balancing procedures described achieve more effective load balancing and increased performance. Both capacity and request processing time may be significantly improved. Overhead is minimized by taking advantage of idle time of database nodes.

It will be apparent to those of ordinary skill in the art that the present invention can be embodied in other specific forms without departing from the spirit or essential character thereof. The foregoing description is therefore intended to be in all respects illustrative and not restrictive. The scope of the invention is indicated by the appended claims, not by the foregoing description, and all changes which come within the meaning and range of equivalents thereof are intended to be embraced therein.

What is claimed is:

1. A method of load balancing in a parallel database system comprising at least a plurality of database nodes, the method comprising:
    identifying a database node having an excessive load, the excessive load being a load that is greater than loads on other nodes of said plurality of nodes;
    determining a threshold number of database nodes to which to transfer load from said database node having an excessive load;
    identifying a group of database nodes having a first subset of database nodes having both at least said threshold number of database nodes and a separate second subset of database nodes such that when an entire load for a first relation is transferred from the first subset of nodes to the second subset of nodes an average load of said second subset of nodes is less than an average load of the plurality of database nodes; and
    performing a load adjustment comprising transferring said entire load for a first relation from said first subset of database nodes to said second subset of database nodes and transferring load for a second relation from said database node having an excessive load to said first subset of database nodes.

2. The method of claim 1, further comprising using a system skew measure to determine whether or not to make said load adjustment.

3. The method of claim 1, performing a load adjustment further comprising:
    causing said first subset of database nodes to have zero or low load for said first relation.

4. The method of claim 1, wherein performing a load adjustment occurs while handling load balancing operations on other relations on an overlapping set of database nodes.

5. The method of claim 1, wherein performing a load adjustment occurs while handling load balancing operations on a non-overlapping set of database nodes.

6. The method of claim 1,
    wherein performing a load adjustment includes moving tuples of the first relation from the first subset of database nodes to the second subset of database nodes; and
    wherein data movement for performing a load adjustment occurs in parallel.

7. The method of claim 1, further comprising selecting the at least one database node of the first subset of nodes that is logically adjacent to the database node having an excessive load.

8. The method of claim 1, wherein database nodes of the group of database nodes are logically adjacent to one another.

9. The method of claim 1, further comprising:
    identifying a plurality of candidate groups of database nodes having light loads;
    evaluating the plurality of candidate groups of database nodes; and
    selecting one of the candidate groups of database nodes as said group of database nodes to participate in load balancing.

10. The method of claim 1, further comprising:
    computing a load imbalance measure based on a difference between actual load and average load;
    using the load imbalance measure to determine a database node having an excessive load; and
    using the load imbalance measure to determine the group of database nodes having light loads.

11. The method of claim 7, further comprising:
    copying tuples from at least the database node having an excessive load to the at least one database node; and
    deleting from the database node having an excessive load the tuples.

12. The method of claim 11, further comprising continuing to service requests for nodes participating in rebalancing during the rebalancing.

13. The method of claim 11, further comprising continuing to service requests for a relation participating in rebalancing during the rebalancing.

14. A method of load balancing in a parallel database system comprising a plurality of database nodes, the method comprising:
    monitoring loads of database nodes by comparing a load of each database node with an average load of the database nodes for a relation; and
    when the load of a database node is excessive for that relation, scheduling a load balancing operation taking into account any database nodes that are expected to be idle during a scheduled time of the load balancing operation.

15. The method of claim 14, wherein database nodes expected to be idle are selected preferentially to participate in the load balancing operation.

16. The method of claim 14, further comprising:
identifying a group of database nodes having light loads relative to the database node having an excessive load;
performing a load adjustment among the group of database nodes so that at least one database node of the group has zero or low load; and
performing a load adjustment between the database node having an excessive load and the at least one database node of the group, wherein both the database node having an excessive load and the at least one database node of the group have loads closer to an average load over said group of database nodes.

17. A method of load balancing in a parallel database system comprising a plurality of database nodes, the method comprising:
computing a system skew based on an estimated number of tuples stored on each node for a relation in the database;
determining that the system skew exceeds a system skew threshold and a load of a node for a relation is greater than a load of other nodes for the relation, according to current partition boundaries of the relation;
calculating a number of free nodes needed to reduce the system skew;
selecting a sequence of nodes that supplies at least the calculated number of free nodes;
computing new partition boundaries for the relation based on the selected sequence of nodes;
starting a transaction that transfers tuples of the relation according to the new partition boundaries; and
committing the transaction.

18. A method of balancing a load in a parallel database system having a plurality of database nodes, the method comprising:
detecting a system skew among partition nodes of a relation, the partition nodes being associated with partition boundaries for the relation;
determining that the system skew exceeds a system skew threshold; and
performing a rebalancing database transaction for the relation by altering the partition boundaries boundary to form new partition boundaries and moving tuples of the relation between nodes according to the new partition boundaries to reduce the system skew among the partition nodes for the relation.

19. A non-transitory computer-readable medium comprising instructions for load balancing a parallel database system comprising a plurality of database nodes, said instructions when executed by one or more computing devices, cause performance of:
computing a system skew based on an estimated number of tuples stored on each node for a relation in the database;
determining that the system skew exceeds a system skew threshold and a load of a node for a relation is greater than a load of other nodes for the relation, according to current partition boundaries of the relation;
calculating a number of free nodes needed to reduce the system skew;
selecting a sequence of nodes that supplies at least the calculated number of free nodes;
computing new partition boundaries for the relation based on the selected sequence of nodes;
starting a transaction that transfers tuples of the relation according to the new partition boundaries; and
committing the transaction.

20. A non-transitory computer-readable medium comprising instructions for load balancing a parallel database system comprising a plurality of database nodes, said instructions when executed by one or more computing devices, cause performance of:
detecting a system skew among partition nodes of a relation, the partition nodes being associated with partition boundaries for the relation;
determining that the system skew exceeds a system skew threshold; and
performing a rebalancing database transaction for the relation by altering the partition boundaries boundary to form new partition boundaries and moving tuples of the relation between nodes according to the new partition boundaries to reduce the system skew among the nodes for the relation.

21. A non-transitory computer-readable medium comprising instructions for load balancing in a parallel database system comprising at least a plurality of database nodes, said instructions when executed by one or more computing devices, cause performance of:
identifying a database node having an excessive load, the excessive load being a load that is greater than loads on other nodes of said plurality of nodes;
determining a threshold number of database nodes to which to transfer load from said database node having an excessive load;
identifying a group of database nodes having a first subset of database nodes having both at least said threshold number of database nodes and a separate second subset of database nodes such that when an entire load for a first relation is transferred from the first subset of nodes to the second subset of nodes an average load of said second subset of nodes is less than an average load of the plurality of database nodes; and
performing a load adjustment comprising transferring said entire load for a first relation from said first subset of database nodes to said second subset of database nodes and transferring load for a second relation from said database node having an excessive load to said first subset of database nodes.

22. The non-transitory computer-readable medium of claim 21, the instructions further comprising instructions for using a system skew measure to determine whether or not to make said load adjustment.

23. The non-transitory computer-readable medium of claim 21, said performing a load adjustment further comprising:
causing said first subset of database nodes to have zero or low load for said first relation.

24. The non-transitory computer-readable medium of claim 21, the instructions further comprising instructions for performing a load adjustment while handling load balancing operations on other relations on an overlapping set of database nodes.

25. The non-transitory computer-readable medium of claim 21, the instructions further comprising instructions for performing a load adjustment while handling load balancing operations on a non-overlapping set of database nodes.

26. The non-transitory computer-readable medium of claim 21, said performing a load adjustment includes moving tuples of the first relation from the first subset of database nodes to the second subset of database nodes; and wherein data movement for performing a load adjustment occurs in parallel.

27. The non-transitory computer-readable medium of claim 21, the instructions further comprising instructions for selecting the at least one database node of the first subset of nodes that is logically adjacent to the database node having an excessive load.

28. The non-transitory computer-readable medium of claim 21, wherein database nodes of the group of database nodes are logically adjacent to one another.

29. The non-transitory computer-readable medium of claim 21, the instructions further comprising instructions for:
identifying a plurality of candidate groups of database nodes having light loads;
evaluating the plurality of candidate groups of database nodes; and
selecting one of the candidate groups of database nodes as said group of database nodes to participate in load balancing.

30. The non-transitory computer-readable medium of claim 21, the instructions further comprising instructions for:
computing a load imbalance measure based on a difference between actual load and average load;
using the load imbalance measure to determine a database node having an excessive load; and
using the load imbalance measure to determine the group of database nodes having light loads.

31. The non-transitory computer-readable medium of claim 27, further comprising instructions for:
copying tuples from at least the database node having an excessive load to the at least one database node; and
deleting from the database node having an excessive load the tuples.

32. The non-transitory computer-readable medium of claim 31, further comprising instructions for continuing to service requests for nodes participating in rebalancing during the rebalancing.

33. The non-transitory computer-readable medium of claim 31, further comprising instructions for continuing to service requests for a relation participating in rebalancing during the rebalancing.

* * * * *

UNITED STATES PATENT AND TRADEMARK OFFICE
CERTIFICATE OF CORRECTION

| | | |
|---|---|---|
| PATENT NO. | : 8,849,749 B2 | Page 1 of 1 |
| APPLICATION NO. | : 12/860782 | |
| DATED | : September 30, 2014 | |
| INVENTOR(S) | : Rishel et al. | |

It is certified that error appears in the above-identified patent and that said Letters Patent is hereby corrected as shown below:

In the Specification

In column 3, line 34, delete "system" and insert -- system. --, therefor.

In column 3, line 42, delete "performance" and insert -- performance. --, therefor.

Signed and Sealed this
Twenty-eighth Day of April, 2015

Michelle K. Lee
*Director of the United States Patent and Trademark Office*